No. 731,814. PATENTED JUNE 23, 1903.
W. B. POTTER & C. D. CLARK.
COMBINED POWER AND BRAKE SYSTEM.
APPLICATION FILED OCT. 31, 1900.
NO MODEL.
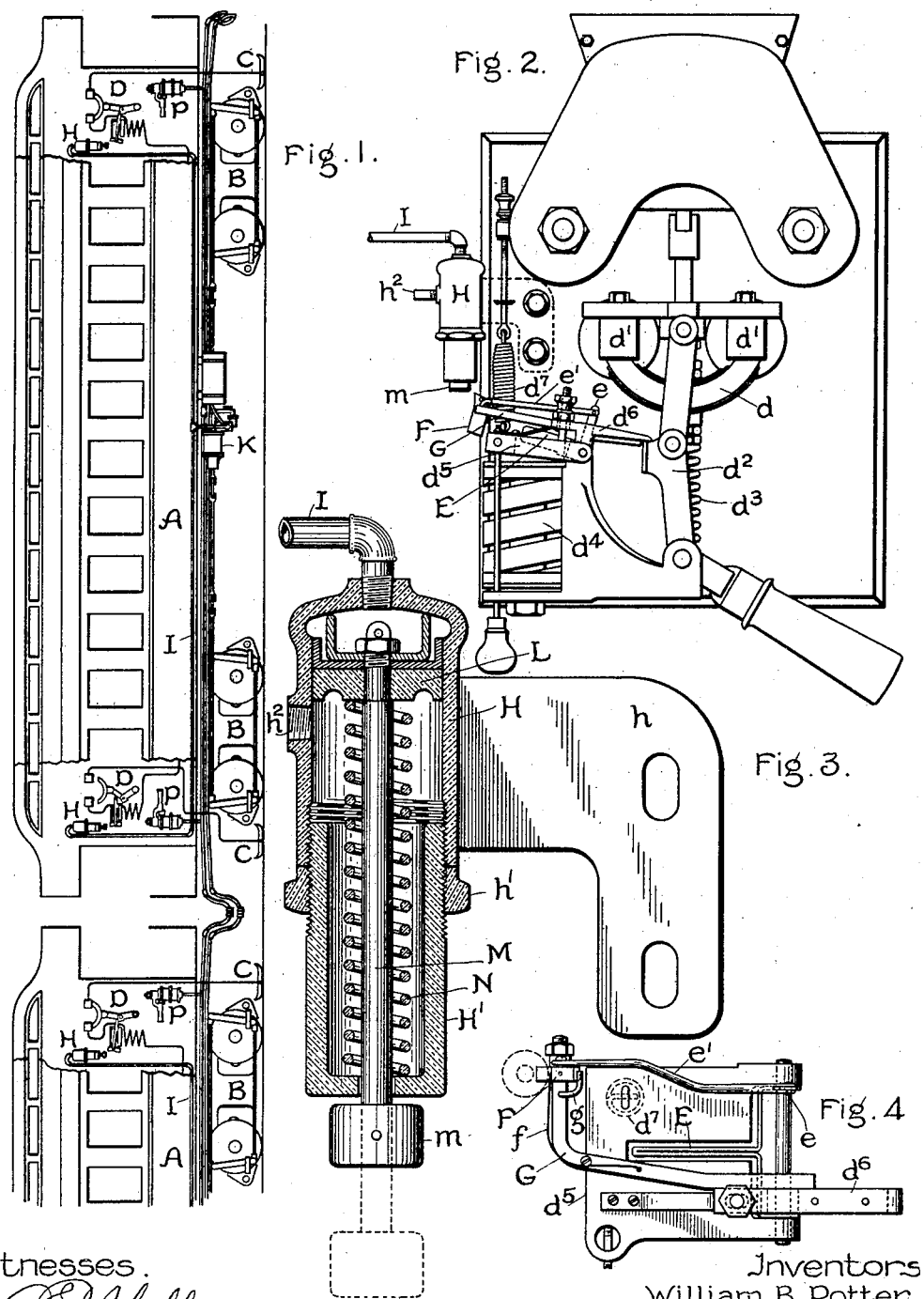
Witnesses
Lewis Abell
Alex F. Macdonald
Inventors
William B. Potter
Clarence D. Clark,
by Albert G. Davis
Atty.

No. 731,814.

Patented June 23, 1903.

UNITED STATES PATENT OFFICE.

WILLIAM B. POTTER AND CLARENCE D. CLARK, OF SCHENECTADY, NEW YORK, ASSIGNORS TO THE GENERAL ELECTRIC COMPANY, A CORPORATION OF NEW YORK.

COMBINED POWER AND BRAKE SYSTEM.

SPECIFICATION forming part of Letters Patent No. 731,814, dated June 23, 1903.

Application filed October 31, 1900. Serial No. 35,003. (No model.)

*To all whom it may concern:*

Be it known that we, WILLIAM B. POTTER and CLARENCE D. CLARK, citizens of the United States, residing at Schenectady, in the county of Schenectady, State of New York, have invented certain new and useful Improvements in a Combined Power and Brake System, of which the following is a specification.

Our invention relates to combined power and brake systems for electric motors, and has for its object to effect an automatic breaking of the motor-circuit in case the brakes are applied without first shutting off the current.

While our invention is generally applicable to all power systems in which brakes are employed, it is peculiarly valuable in connection with electric-railway systems, for in the excitement of a possible collision or other accident the motorman is likely to throw on the brakes before he turns off the current energizing the motor. This subjects both the motor and the brakes to excessive and injurious strains, which it is the object of our invention to prevent.

In embodying our invention in practical form we provide in the motor-circuit a circuit-breaking device and mount adjacent to it an actuating device operatively connected to the brake system in any desired way, so that it will be actuated whenever the brakes are applied. In connection with the actuating device we employ some means whereby it will affect the circuit-breaking device only in case the motor-circuit has not been opened before the brakes are actuated. By this arrangement we are enabled to secure an immediate opening of the motor-circuit whenever the brakes are applied before the motor-controlling switch has been turned to its open-circuit position, while if the motor-circuit has been already opened the circuit-breaking device will not be operated.

The brake system as shown is operated by compressed air; but our invention is of course not limited to a system of this particular type.

The circuit-breaking device, as shown in the drawings, is an automatic circuit-breaker provided with a tripping device carrying a member arranged to be projected into the path of movement of an actuating device whenever current is flowing in the motor-circuit. The actuating device is a plunger which is attached to a piston in a cylinder, connected by suitable piping to the brake-cylinder.

The circuit-breaker, together with its actuating device and the electrically-actuated member for bringing the circuit-breaker and the actuating device into operative relation with one another, constitutes a combination which is described and claimed in our application, Serial No. 89,332, filed January 11, 1902, as a division of the present application.

The electrically-actuated member, which is arranged to be projected into the path of movement of the actuating device, consists in the particular construction which we have illustrated of a pivoted dog mounted on the tripping device of the circuit-breaker and connected to an auxiliary armature capable of being attracted by the overload-coil of the circuit-breaker, and thereby tilted into the path of movement of the plunger, which constitutes the actuating device. In the operation of our invention the plunger, which is actuated at every application of the brakes, will strike the dog, depressing the tripping device of the circuit-breaker, and thereby releasing the switch-lever in every case where the current is permitted to continue flowing through the circuit-breaker. If, however, the motorman shuts off the current before applying the brakes, the dog will swing back out of the way of the plunger and the device is rendered inoperative.

In the accompanying drawings, Figure 1 is a diagrammatic side elevation, partly broken away, of a portion of an electric railway-train equipped with our invention. Fig. 2 is an elevation, on an enlarged scale, of the circuit-breaker provided with our invention. Fig. 3 is a longitudinal section, on a still larger scale, of the air-cylinder and plunger. Fig. 4 is a plan view of the armature and the pivoted dog.

The cars A are shown provided with motor-trucks B.

In circuit with the traveling contact C is a circuit-breaker D of any approved type. We have shown the one patented to W. B. Potter January 25, 1895, No. 533,083. In this apparatus the bridging-contact $d$ is held closed against the contacts $d'$ by a toggle $d^2$, which constantly tends to open under the tension of the strong spring $d^3$. A series coil $d^4$ has a pivoted armature $d^5$, on which is pivotally and adjustably mounted a tripping device or detent $d^6$ to lock the toggle with the contacts closed. An abnormal current energizes the coil $d^4$, which attracts the armature against the tension of its supporting-spring $d^7$ and releases the toggle, thereby allowing the spring $d^3$ to throw open the switch. In applying our invention to this apparatus we provide an auxiliary armature E, pivoted on the fulcrum of the armature $d^5$ and free to be attracted by the coil $d^4$. It has a rock-arm $e$, which is connected by a link $e'$ with a movable member or dog F, pivotally supported on the end of a bar G and adapted to be tilted by the movement of the armature E. The bar G is attached to the detent $d^6$. A light spring $f$ retracts the dog against a stop $g$ when the coil $d^4$ is not energized. An air-cylinder H is supported adjacent to the coil $d^4$, preferably by means of a bracket $h$, attached to the base of a circuit-breaker D. The upper end of the cylinder is connected by a pipe I with the brake-cylinder K of the air-brake system, preferably at the triple valve. In the cylinder is a packed piston L, having a piston rod or plunger M projecting through the lower head $H'$ of the cylinder. A helical spring N abuts against the under side of the piston. Its lower end is supported adjustably for tension, preferably by the head $H'$, which may be cupped and screwed into the lower end of the cylinder and held by a locking-nut $h'$. The end of the plunger may be provided with a head $m$. In the side of the cylinder is an exhaust-port $h^2$.

The operation of our device is as follows: The armature $d^5$ is not influenced by a normal current in the coil $d^4$; but the auxiliary armature E is attracted and tilts the dog forward so long as the current remains turned on. When the brakes are applied by operating one of the engineer's valves P, the plunger M is forced downward by air passing from the triple valve through the pipe I to the cylinder H. In case the current has not been shut off, the descending plunger strikes the dog F and drives down the bar G, thereby operating the tripping device $d^6$ and releasing the toggle of the circuit-breaker. The spring $d^3$ instantly opens the switch, cutting off the current from the motor.

Our invention is applicable not only to single cars, but to two or more coupled together to form a train and having the brakes controllable from any car of the train. Thus in Fig. 1 we have shown two cars equipped with air-brakes which are connected between the cars by flexible coupling-hose, as usual. Since the brakes can be set on all the cars by the manipulation of any one of the engineer's valves P, it follows that all the circuit-breakers will be simultaneously operated.

What we claim as new, and desire to secure by Letters Patent of the United States, is—

1. In a vehicle equipped with electric propelling-motors and a brake system, a circuit-breaking device included in the circuit of the motors, an actuating device arranged to be operated upon the application of the brakes, and means whereby the actuating device will affect the circuit-breaking device only in case the motor-circuit has not yet been opened.

2. In combination, one or more motors connected to a load, a brake system therefor, a circuit-breaking device included in circuit between a source of supply and the motors, an actuating device arranged to be operated upon the application of the brakes, and means whereby the actuating device will affect the circuit-breaking device only in case the connection to the source of supply has not been broken before the brakes are actuated.

3. In combination, one or more motors connected to a load, a brake system therefor, a circuit-breaking device included in the circuit of the motors, an actuating device arranged to be operated upon the application of the brakes, and means whereby the actuating device will cause the circuit-breaking device to open the motor-circuit only in case current is flowing therein when the brakes are actuated.

4. In combination, a motor or motors connected to a load, an air-brake system therefor, a circuit-breaking device included in the circuit of the motors, an actuating device operatively connected to the air-brake system and arranged to be operated upon the application of the brakes, and means whereby the actuating device will affect the circuit-breaking device only in case the motor-circuit has not been opened.

5. In combination, a motor or motors, an air-brake system therefor, a circuit-breaking device included in the circuit of the motors, an actuating device operatively connected to the air-brake system, and means whereby the actuating device will cause the circuit-breaking device to open the motor-circuit only in case current is flowing therein when the brakes are actuated.

6. In combination, a motor or motors connected to a load, a brake system therefor, an automatic circuit-breaker included in the motor-circuit, a tripping device therefor, an actuating device operatively connected to the brake system, and means whereby the actuating device will affect the tripping device only in case the motor-circuit has not been opened.

7. In combination, a motor or motors connected to a load, a brake system therefor, an automatic circuit-breaker included in the motor-circuit, a tripping device therefor, an actuating device operatively connected to the brake system, and means whereby the actuating device will affect the circuit-breaker only in case the motor-circuit has not been opened.

8. In combination, a motor or motors connected to a load, a brake system therefor, an automatic circuit-breaker included in the motor-circuit, a tripping device therefor, an actuating device operatively connected to the brake system, and means controlled by the flow of current in the motor-circuit for bringing the tripping device into operative relation with the actuating device.

9. In combination, a motor or motors connected to a load, a brake system therefor, an automatic circuit-breaker included in the motor-circuit, a tripping device therefor, an actuating device operatively connected to the brake system, a dog carried by the tripping device and adapted to be engaged by said actuating device, and an electromagnet operatively connected to the motor-circuit for actuating said dog.

10. In combination, a motor or motors connected to a load, an air-brake system therefor, an automatic circuit-breaker included in the motor-circuit, a tripping device therefor, a plunger operatively connected to the air-brake system, a dog carried by the tripping device and arranged to be projected into the path of movement of said plunger, and an electromagnet operatively connected to said dog and having its winding connected to the motor-circuit.

11. In a train system comprising vehicles equipped with propelling-motors and with a brake system, means controlled from any desired point on the train for operating the brakes, circuit-breakers in the several motor-circuits, actuating devices adjacent to each of said circuit-breakers and operatively connected to the brake system, and means whereby the actuating devices will cause the circuit-breakers to open the motor-circuits only in case current is flowing therein when the brakes are actuated.

12. In a train system comprising vehicles equipped with propelling-motors and with an air-brake system, engineer's valves located at any desired points along the train, circuit-breakers in the several motor-circuits, a plunger adjacent to each circuit-breaker and operatively connected to the air-brake system, and means whereby each plunger will cause its corresponding circuit-breaking device to open the motor-circuit only in case current is flowing therein when the brakes are actuated.

13. In a train system comprising vehicles equipped with propelling-motors and with an air-brake system, one or more engineer's valves located at any desired point on the train, automatic circuit-breakers in the several motor-circuits, a plunger adjacent to each of the circuit-breakers and operatively connected to the air-brake system, a tripping device for each of the circuit-breakers, and means controlled by the flow of current in each of the motor-circuits for bringing the several tripping devices into operative relation with the corresponding plungers.

In witness whereof we have hereunto set our hands this 29th day of October, 1900.

WILLIAM B. POTTER.
CLARENCE D. CLARK.

Witnesses:
BENJAMIN B. HULL,
MARGARET E. WOOLLEY.